US010020901B2

(12) United States Patent
Xu et al.

(10) Patent No.: US 10,020,901 B2
(45) Date of Patent: Jul. 10, 2018

(54) INTER-GATEWAY INTERFERENCE MANAGEMENT AND ADMISSION CONTROL FOR A CDMA SATELLITE COMMUNICATIONS SYSTEM

(71) Applicant: Hughes Network Systems, LLC, Germantown, MD (US)

(72) Inventors: Jun Xu, Clarksburg, MD (US); James Jong, North Potomac, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 70 days.

(21) Appl. No.: 14/869,884

(22) Filed: Sep. 29, 2015

(65) Prior Publication Data
US 2016/0094481 A1  Mar. 31, 2016

Related U.S. Application Data

(60) Provisional application No. 62/057,221, filed on Sep. 29, 2014.

(51) Int. Cl.
*H04B 17/336* (2015.01)
*H04B 7/185* (2006.01)
(Continued)

(52) U.S. Cl.
CPC ......... *H04B 17/336* (2015.01); *H04B 7/1853* (2013.01); *H04B 17/345* (2015.01); *H04W 52/365* (2013.01); *H04W 88/16* (2013.01)

(58) Field of Classification Search
None
See application file for complete search history.

(56) References Cited

U.S. PATENT DOCUMENTS 6,298,242 B1 * 10/2001 Schiff ................ H04B 7/18543
455/522
6,356,531 B1 *  3/2002 Soliman ................ H04W 16/04
370/241

(Continued)

OTHER PUBLICATIONS

US Patent Office, "International Search Report & Written Opinion", PCT application No. PCT/US2015/053040, dated Jan. 4, 2016.

*Primary Examiner* — Mohammad Adhami
*Assistant Examiner* — Vladislav Agureyev
(74) *Attorney, Agent, or Firm* — Potomac Technology Law, LLC

(57) ABSTRACT

An approach for inter-gateway interference estimation and admission control is provided. A gateway receives return link signals, each being received via a satellite from a respective user terminal (UT) located within a satellite beam serviced by the gateway. A transmit power factor and an interference factor are determined for each UT based on the respective return link signal. A total interference factor is determined for the UTs based on the transmit power factors and the interference factors. A residual capacity level for the satellite beam is determined based on the total interference factor and a noise power factor. The gateway receives an admission request from a further UT requesting admission for transmission of a return link signal. The gateway determines whether to grant the admission request based on a required capacity level for the return link signal of the further UT relative to the residual capacity level.

14 Claims, 4 Drawing Sheets

(51) Int. Cl.
*H04B 17/345* (2015.01)
*H04W 52/36* (2009.01)
*H04W 88/16* (2009.01)

(56) References Cited

U.S. PATENT DOCUMENTS

| | | | |
|---|---|---|---|
| 6,456,850 B1* | 9/2002 | Kim | H04W 72/0486 455/423 |
| 6,609,002 B1* | 8/2003 | Krishnamurthy | H04B 7/1856 455/12.1 |
| 6,628,921 B1* | 9/2003 | Vaddiparty | H04B 7/1851 455/12.1 |
| 6,904,017 B1 | 6/2005 | Meempat et al. | |
| 6,975,609 B1* | 12/2005 | Khaleghi | H04W 52/343 370/335 |
| 6,985,700 B1* | 1/2006 | Laakso | H04B 1/7103 370/329 |
| 2002/0077113 A1* | 6/2002 | Spaling | H04W 24/08 455/453 |
| 2004/0037238 A1* | 2/2004 | Schiff | H04B 7/18543 370/321 |
| 2004/0132448 A1* | 7/2004 | Torres | H04B 7/18595 455/427 |
| 2005/0111480 A1* | 5/2005 | Martin | H04B 7/18589 370/461 |
| 2007/0149127 A1* | 6/2007 | Karabinis | H04B 7/18563 455/63.1 |
| 2007/0155337 A1* | 7/2007 | Park | H04L 1/0006 455/69 |
| 2008/0181108 A1 | 7/2008 | Hashmi et al. | |
| 2009/0245191 A1* | 10/2009 | Ball | H04W 52/367 370/329 |
| 2010/0203884 A1 | 8/2010 | Zheng | |
| 2011/0007646 A1 | 1/2011 | Miller et al. | |
| 2011/0243016 A1* | 10/2011 | Zhang | H04W 52/365 370/252 |
| 2013/0040683 A1* | 2/2013 | Siomina | H04W 28/0236 455/517 |
| 2013/0135996 A1* | 5/2013 | Torres | H04L 41/5022 370/230 |
| 2013/0250889 A1 | 9/2013 | Kim et al. | |
| 2014/0153478 A1* | 6/2014 | Kazmi | H04B 7/15542 370/315 |
| 2015/0110068 A1* | 4/2015 | Yang | H04W 36/0061 370/331 |

* cited by examiner

INTER-GATEWAY INTERFERENCE MANAGEMENT AND ADMISSION CONTROL FOR A CDMA SATELLITE COMMUNICATIONS SYSTEM

RELATED APPLICATIONS

This application claims the benefit of the earlier filing date under 35 U.S.C. § 119(e) from U.S. Provisional Application Ser. No. 62/057,221 (filed 2014 Sep. 29), which is hereby incorporated by reference herein in its entirety.

BACKGROUND

A code division multiple access (CDMA) system is an interference limited system in that the total system capacity is limited by the interference level. For the return link or uplink of a satellite CDMA system (the link back to the satellite gateway from a user terminal), interference management is critical to prevent system overload. Conventional methods of interference management are typically based on a direct interference measurement or allow a certain maximum number of terminals using an equivalently same data rate (e.g., voice data rate) to be connected. See, e.g., Vanghi, Damnjanovic, and Vojcic, "The CDMA2000 System for Mobile Communications," Prentice Hall, Upper Saddle River, N.J., 2004. In the direct interference measurement method, the interference level is continuously measured at the receiver, and the user terminal transmissions are controlled to maintain the total received interference at the receiver within a certain limit. Alternatively, the number of terminals in transmission at any given time can be counted to sum up the total interference, assuming that each terminal generates a relatively equivalent amount of interference, and then the total summation is controlled to be within the limit.

Challenges may arise, however, when user terminals (UTs) within the same beam coverage are connected to multiple gateways. One gateway may have only the knowledge of terminals connected to it. As such, when sharing the same return link frequency resource at the same time, each of the gateways makes the decision of admitting a UT independently based on the maximum number of channels a gateway can accommodate on a certain frequency band. Consequently, this may result in overloading the system. Interference may also result from terrestrial wireless equipment transmitting on the same frequency as the satellite link, which cannot be known to the gateway. Additionally, in a multiple gateway system, the total number of concurrently active channels may be unknown to any of the gateways, thus rendering it difficult and impractical to apply the conventional methods for a satellite CDMA system when multiple gateways cover the same beam area. Accordingly, in a satellite CDMA system, conventional direct interference measurement methods can be inaccurate and thus make it difficult (if not impossible) to maintain the interference within necessary limits and not overload the system.

Moreover, for quality of service (QoS) provisioning, it is also important that the gateways are aware of and able to manage the interference level of the covered beams. UTs with different traffic types may be provided with differentiated QoS. For example, real-time voice and video may have higher priority than other non-real-time data communications in obtaining network resources (e.g., bandwidth). The interference level is a function of the network traffic load (e.g., higher total traffics load could result in higher interference), and thus managing interference can be achieved via admission control with differentiated QoS provisioning.

What is needed, therefore, is an approach that provides for effective estimation and control of the overall interference level of a satellite communications system (e.g., a CDMA satellite system) within a range to prevent system overload, without using direct interference measurements, and which permits each individual gateway to make admission decisions autonomously.

SOME EXAMPLE EMBODIMENTS

Embodiments of the present invention advantageously address the foregoing requirements and needs, as well as others, by providing a novel approach for indirect inter-gateway interference estimation, management and traffic admission control, which achieves effective estimation and control of the overall interference level of a satellite communications system (e.g., a CDMA satellite system), without using direct interference measurements, and permits each individual gateway to make admission decisions autonomously. In accordance with example embodiments, the present approach comprises two components—one being indirect interference estimation (without requiring direct measurement), and a second being an admission control scheme that avoids overloading.

According to example embodiments, an approach is provided for estimating beam level interference using received signal-to-interference ratio (SIR), known UT location and UT reported power headroom (PHR), within a multi-gateway satellite communications system. By way of example, a gateway periodically estimates run-time return link interference. The interference estimation utilizes a UT's transmit power level (e.g., obtained from a UT power headroom report), the UT's location information and the antenna gain of both the UT and the satellite. The estimated interference can then be compared with a pre-defined threshold. If the estimated interference is lower than the threshold, the respective UT may be admitted subject to its interference contribution—otherwise, the UT is not admitted.

By way of further example, the determination of whether to admit a UT is based on the equivalent resource the UT may consume, which may be calculated as a portion of its interference contribution. If the contributed interference from the UT does not make the overall interference exceed the threshold, then the UT can be admitted—otherwise, the UT is rejected. Additionally, when the estimated interference is higher than the threshold, the gateways are able to manage the overall load to by reducing the load of other connections to accommodate for admission of a new UT, for example, based relative priorities of the respective application or traffic type each UT is transmitting. The admission of example embodiments is thereby proactive and reactive, as an admission decision for multiple gateways would be the same as for one gateway, and each can operate autonomously given that the actual interference level would be transparent to the gateways. Further, taking into account system overload, each of the gateways autonomously performs interference relief measures to reduce the load and restore the interference to normal level. The admission control scheme thereby responds promptly and efficiently since the GWs do not need to communicate with each other in the process.

In accordance with further example embodiments, a method for indirect inter-gateway interference estimation, management and traffic admission control is provided. A gateway receiver receives a plurality of return link signals, each return link signal being received via a satellite from a respective user terminal (UT) located within a satellite beam serviced by the GW terminal. A transmit power factor is determined for each UT based on the respective return link signal. An interference factor is determined for each UT based on the respective return link signal. A total interference factor for the UTs is determined based on the transmit power factors and the interference factors determined for the UTs. A residual capacity level is determined for the satellite beam based on the determined total interference factor and a noise power factor. The gateway receiver receives an admission request from a further UT requesting admission for transmission of a respective return link signal by the further UT. The gateway determines whether to grant the admission request based on a required capacity level for the respective return link signal of the further UT relative to the determined residual capacity level. By way of example, a power-headroom value is obtained for each UT conveyed by the respective return link signal, wherein the transmit power factor for the UT is determined based on the respective power-headroom value and a maximum transmit power of the UT. By way of further example, the total interference factor is determined for the UTs by applying an averaging function based on a plurality of parameters for each UT, including the determined transmit power factor and the determined interference factor.

In accordance with further embodiments of the method, an available residual capacity level is determined as the residual capacity level minus a minimum residual capacity level buffer, wherein the determination of whether to grant the admission request is based on the required capacity level for the respective return link signal of the further UT relative to the determined available residual capacity level. By way of example, the available residual capacity level is determined in terms of a number of available resource units, wherein one resource unit reflects a capacity level associated with a base signal type with respect to the return link signals of the UTs located within the satellite beam serviced by the GW terminal, and the required capacity level for the respective return link signal of the further UT reflects a number of the available resource units required for transmission of the return link signal of the further UT to the GW terminal via the satellite beam.

In accordance with further embodiments of the method, the respective return link signal of the further UT is characterized as one of two or more signal types with respect to the return link signals of the UTs located within the satellite beam serviced by the GW terminal, and an available residual capacity level is determined for each of the two or more signal types, wherein each available residual capacity level is determined as the residual capacity level minus a minimum residual capacity level buffer for the respective signal type. Further, the determination of whether to grant the admission request is based on the required capacity level for the signal type of the respective return link signal of the further UT relative to the determined available residual capacity level for the respective signal type. By way of example, the available residual capacity level for each signal type is determined in terms of a number of available resource units for the respective signal type, wherein one resource unit reflects a capacity level associated with a base signal type with respect to the return link signals, and the required capacity level for the respective return link signal type of the further UT reflects a number of the available resource units for the respective signal type required for transmission of the return link signal of the further UT to the GW terminal via the satellite beam.

In accordance with further example embodiments, a gateway (GW) terminal for indirect inter-gateway interference estimation, management and traffic admission control is provided. The GW terminal comprises a receiver configured to receive a plurality of return link signals and to determine an interference factor for each UT based on the respective return link signal, each return link signal being received via a satellite from a respective user terminal (UT) located within a satellite beam serviced by the GW terminal. The GW terminal further comprises a processor configured to determine a transmit power factor for each UT based on the respective return link signal, to determine a total interference factor for the UTs from which the plurality of return link signals have been received based on the transmit power factors and the interference factors determined for the UTs, and to determine a residual capacity level for the satellite beam based on the determined total interference factor and a noise power factor. The receiver is further configured to receive an admission request from a further UT requesting admission for transmission of a respective return link signal by the further UT. The processor is further configured to determine whether to grant the admission request based on a required capacity level for the respective return link signal of the further UT relative to the determined residual capacity level. By way of example, the processor is configured to obtain a power-headroom value for each UT conveyed by the respective return link signal, wherein the transmit power factor for the UT is determined based on the respective power-headroom value and a maximum transmit power of the UT. By way of further example, the interference factor for each UT reflects a signal to interference ratio estimated by the receiver based on the respective return link signal. By way of further example, the processor is configured to determine the total interference factor for the UTs by applying an averaging function based on a plurality of parameters for each UT, including the determined transmit power factor and the determined interference factor.

In accordance with further embodiments of the GW terminal, the processor is further configured to determine an available residual capacity level as the residual capacity level minus a minimum residual capacity level buffer, wherein the determination of whether to grant the admission request is based on the required capacity level for the respective return link signal of the further UT relative to the determined available residual capacity level. By way of example, the available residual capacity level is determined in terms of a number of available resource units, wherein one resource unit reflects a capacity level associated with a base signal type with respect to the return link signals of the UTs located within the satellite beam serviced by the GW terminal, and the required capacity level for the respective return link signal of the further UT reflects a number of the available resource units required for transmission of the return link signal of the further UT to the GW terminal via the satellite beam.

In accordance with further embodiments of the GW terminal, the respective return link signal of the further UT is characterized as one of two or more signal types with respect to the return link signals of the UTs located within the satellite beam serviced by the GW terminal, and the processor is configured to determine an available residual capacity level for each of the two or more signal types, wherein each available residual capacity level is determined as the residual capacity level minus a minimum residual capacity level buffer for the respective signal type. Further, the determination of whether to grant the admission request is based on the required capacity level for the signal type of the respective return link signal of the further UT relative to the determined available residual capacity level for the respective signal type. By way of example, the available residual capacity level for each signal type is determined in terms of a number of available resource units for the respective signal type, wherein one resource unit reflects a capacity level associated with a base signal type with respect to the return link signals, and the required capacity level for the respective return link signal type of the further UT reflects a number of the available resource units for the respective signal type required for transmission of the return link signal of the further UT to the GW terminal via the satellite beam.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings, in which like reference numerals refer to similar elements, and in which.

DETAILED DESCRIPTION

A novel approach for indirect inter-gateway interference estimation, management and traffic admission control, which achieves effective estimation and control of the overall interference level of a satellite communications system (e.g., a CDMA satellite system), without using direct interference measurements, and which permits each individual gateway to make admission decisions autonomously, is provided. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Interference Estimation.

Figure 1:
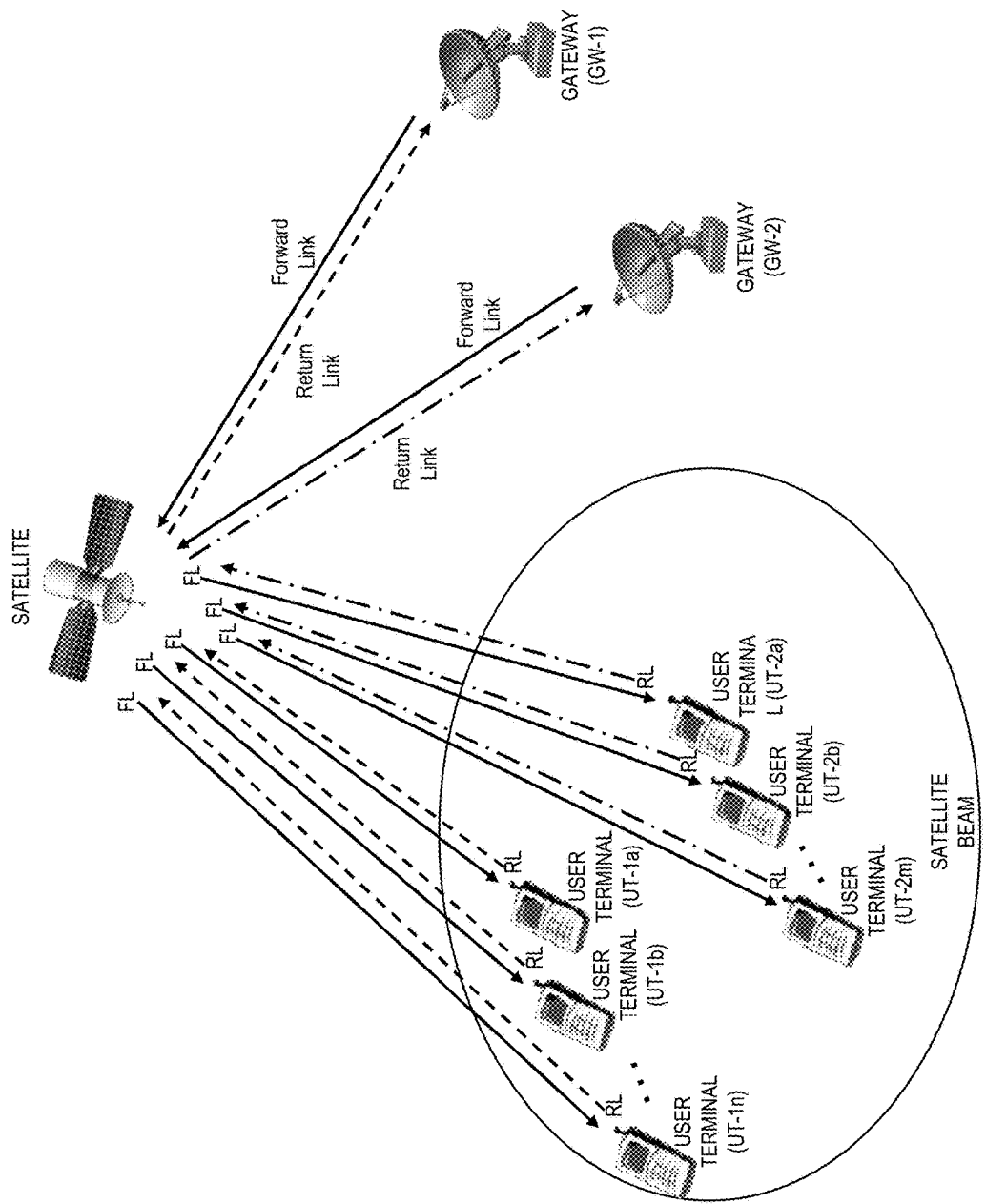
FIG. 1 illustrates a satellite communications system that employs approaches for indirect inter-gateway interference estimation, management and traffic admission control, where multiple user terminals (UTs) located in a common satellite beam are serviced by different gateways, in accordance with example embodiments of the present invention.

FIG. 1 illustrates a satellite communications system that employs approaches for indirect inter-gateway interference estimation, management and traffic admission control, where multiple user terminals (UTs) located in a common satellite beam are serviced by different respective gateways, in accordance with example embodiments. As depicted in FIG. 1, the coverage area of the satellite beam is managed by multiple gateways (GW1 and GW2). Further, the multiple user terminals (UTs) in a single beam are associated with/serviced by different respective gateways, where each gateway has knowledge of only those UTs with which it is associated. Specifically, the UTs $1a, 1b, \ldots, 1n$ are associated with the GW-1 and the UTs $2a, 2b, \ldots, 2m$ are associated with the GW-2, and all the UTs are located within a single satellite beam. The communication/transmission direction from the GW to the UT is referred to as the forward link (FL) or outroute, and the communication/transmission direction from the UT to the GW is referred to as the return link (RL) or inroute. It should be noted that the GWs may not communicate with each other, for example, when the GWs are located in different countries. Further, in a system where UTs share the same frequency (e.g., a code division multiple access (CDMA) system), UTs $1a, 1b, \ldots, 1n$ generate interference to both the GW-1 and GW-2 when transmitting via GW-1, and the UTs $2a, 2b, \ldots, 2m$ generate interference to both the GW-1 and GW-2 when transmitting via GW-2. The interference experienced at a given GW, resulting from UT transmissions via other GWs, shall be referred to herein as inter-GW interference. Further, in a CDMA system, for example, there is no time and frequency coordination between UTs, so the UTs interfere with each other, because there is no exclusive timing/frequency assignments amongst the UTs (the UT's share the same pool of frequencies).

Figure 2:
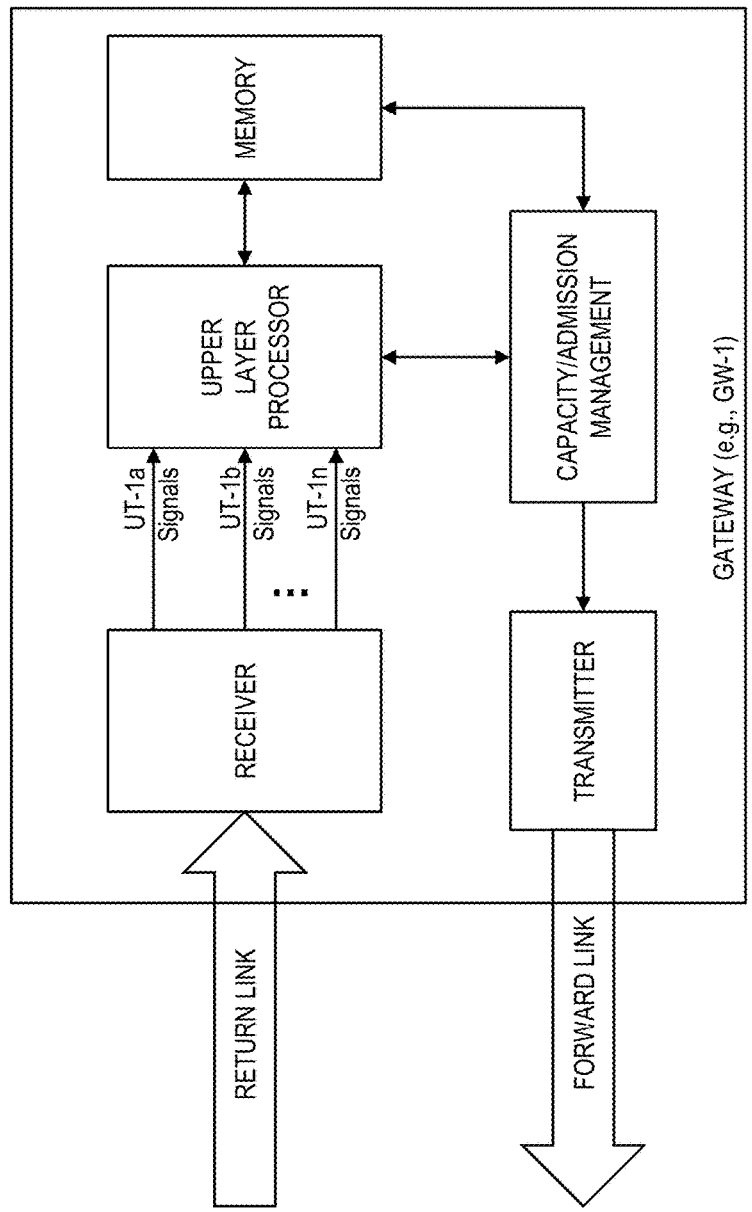
FIG. 2 illustrates a block diagram depicting a Gateway (GW), and highlighting certain GW elements that perform roles in the approaches for indirect inter-gateway interference estimation, management and traffic admission control, in accordance with example embodiments of the present invention.

FIG. 2 illustrates a block diagram depicting a Gateway (GW), and highlighting certain GW elements that perform roles in the approaches for indirect inter-gateway interference estimation, management and traffic admission control, in accordance with example embodiments. The GW comprises at least one receiver (of which the figure depicts only one), an upper layer processor, a capacity and admission management module or processing section, memory storage and at least one transmitter (of which the figure depicts only one). The functioning of these GW elements with regard to embodiments of the present invention are described in further detail below.

Power Headroom. When each UT transmits signals to the GW via the satellite (the return link or inroute), the UT provides a pilot signal along with the data signal—the pilot signal channel and the data channel are multiplexed together in a code division multiplexed manner. Power control is performed based on the pilot signal, and data signal power levels have a fixed relationship relative to the pilot power level depending on the type of data signal—each type of data signal will have a respective power that is based on a fixed relationship to the pilot signal power. For example, a voice channel may have a power level that is always 10 dB higher than the pilot power level, a 19.2 kbps data channel may have a power level that is always 13 dB higher than the pilot power level, and a 72 kbps data channel may have a power level that is always 20 dB higher than the pilot power level. Further, with each transmission the UT provides a power level field, in terms of a power headroom (PowerHR), indicating the power level at which the UT is transmitting.

The PowerHR of a pilot return link can be characterized as the difference (in dB) between the maximum (nonbacked-off) transmit power level of the UT (which is generally is a known constant based on the type of UT), and the actual transmit power level of the return pilot at the transmitter, which can be expressed as:

$$\text{PowerHR(dB)} = P_{tx\text{-}max} - P_{tx\text{-}pilot} \quad (1)$$

Or $$P_{tx\text{-}pilot} = P_{tx\text{-}max} - \text{PowerHR(dB)} \quad (1a)$$

where $P_{tx\text{-}max}$ reflects the maximum transmit power of the UT and $P_{tx\text{-}pilot}$ reflects the return pilot power of the UT. With reference to FIG. 2, the GW receiver receives the return link signals from the satellite, and demodulates and decodes the signals into the constituent respective UT signals. The receiver passes the UT signals on to the upper layer processor. The upper layer processor determines the pilot signal power for each UT, and stores the determined UT power figures for subsequent processing.

The PowerHR results in a pilot output power that is independent of previous settings. For example, if setting PowerHR to 0 for a particular UT produces a pilot output power of −10 dBW, then a PowerHR of 10 dB shall produce a nominal value of −20 dBW. $P_{tx\text{-}max}$ is UT type and return carrier frequency dependent. Accordingly, when the GW receives the reported PowerHR, it can calculate the pilot power (see Eq. (1a), above). It should be noted, however, that averaging may be needed to reduce uncertainty due to imperfect calibration. Given the pilot power $P_{tx\text{-}pilot}$, the UT's actual power $P_{tx\text{-}actual}$ can be obtained via the power-to-pilot ratio, which is fixed for a certain transmission rate. PowerHR is used to facilitate return link interference estimation. PowerHR is reported to the gateway periodically. The GW can infer the actual transmit power given the PowerHR and power-to-pilot ratio. Further, the GW can perform this calculation for each UT with which the GW is associated, and thereby tracks the pilot power of all the respective UTs.

Interference Estimation. The return link consists two parts: one from the terminal to the satellite (e.g., referred to as the uplink (UL) or mobile link), and the second from the satellite to the GW (e.g., referred to as the downlink (DL) or feeder link). The signal to interference ratio (SIR) is a composite of all the data over a composite of all the interference. With reference again to FIG. 2, the GW receiver estimates the SIR (signal to interference ratio—where the interference reflects the total interference experienced by the received signal based on all sources, including other terminals in the GW and in adjacent gateways, and the system noise (e.g., Gaussian noise)) for each UT transmission, and passes the estimated SIR values for each UT return signal to the upper layer processor. Various methods for estimation of the SIR by a satellite receiver would be known by one of skill in the art, and, according to example embodiments, the estimation of the SIR can be accomplished via any one of such recognized methods. The upper layer processor performs the subsequent calculations with respect to total interference and residual capacity, based on the individual UT SIR values estimated by the receiver and the calculated individual UT pilot transmit powers, as described in further detail below. The full path signal-to-interference ratio ($SIR_{total}$) can be expressed in terms of the SIR of the uplink and the SIR of the downlink, as follows:

$$SIR_{total} = \frac{1}{SIR_{UL}^{-1} + SIR_{DL}^{-1}}$$

where $SIR_{UL}$ and $SIR_{DL}$ are the signal to interference plus noise ratio of the mobile link (uplink or UL) and the feeder link (downlink or DL), respectively. See, e.g., Maral and Bousquet, "Satellite Communications Systems: Systems, Techniques and Technology," John Wiley & Sons, 1998. Further, usually the feeder link SIR is sufficiently high compared to that of the mobile link, and thus the value of the full path SIR ($SIR_{total}$) is approximately the same as the mobile link SIR. In accordance with example embodiments, therefore, the $SIR_{total}$ can be estimated at the GW receiver as being relatively equal to the SIR for only the mobile link.

By way of example, assuming M UTs with known locations and return pilot transmit power (e.g., return pilot transmit power is the difference between the maximum UT transmit power and the PowerHR—see Eq. (1a) above), the received pilot SIR for these UTs can be expressed as:

$$SIR_i^{(p)} = \frac{P_i^{Tx,p} \cdot d_i \cdot g_i^{(S)} \cdot g_i^{(U)} \cdot \alpha_i}{I_i}, \quad (2)$$

$$i = 1, 2, \ldots, M$$

where $P_i^{Tx,p}$ is the pilot transmit power for UT(i), $d_i$ is the return link path loss, $g_i^{(S)}$ and $g_i^{(U)}$ are the antenna gains for the satellite and UT, respectively, $\alpha_i$ is the shadowing, and $I_i$ is the total beam level interference plus thermal noise perceived by UT(i).

Accordingly, in accordance with such example embodiments (as specified above), for each individual UT, the SIR is estimated by the GW receiver, and the pilot transmit power is derived based on the reported power headroom. Further, if the location of the UT is known, the return link path loss and satellite antenna gain can be determined/known. The nominal value of the gain of the UT antenna is also given as a constant as the maximum transmit power. If the shadowing loss is known, then the interference a UT experiences can be derived base on Eq. (2). The shadowing can be modeled as zero mean log-normal distribution. Accordingly, while the shadowing fluctuates and varies among UTs over the short term, the long term average can reasonably be considered as one. Therefore, since the shadowing can be averaged out over time, using measurements of multiple UTs improves reliability of the interference estimation. Moreover, while rain fade may cause substantial signal loss in Ku or Ka band, with example embodiments that contemplate a mobile CDMA system, where the return link runs on L-band or S-band that are much less susceptible to rain fade, the loss caused by rain fade can be considered as negligibly small.

By way of example, for a period of K update intervals (e.g., one update interval may consist of one or more 20 ms radio frames), assuming that inner loop power control tracks the SIR target, and the average interference experienced by UT(i) is $I_i$, Equation (2) can be rearranged, and expressed as follows:

$$\sum_{k=1}^{K} \alpha_i(k) = I_i \sum_{k=1}^{K} \frac{SIR_i^{(p)}(k)}{P_i^{Tx,p}(k) \cdot d_i(k) \cdot g_i^{(S)}(k) \cdot g_i^{(U)}(k)} \quad (3)$$

and thus, for a particular UT(i), the perceived interference can be expressed as:

$$\sum_{k=1}^{K} \alpha_i(k) = I_i \sum_{k=1}^{K} \frac{SIR_i^{(p)}(k)}{P_i^{Tx,p}(k) \cdot d_i(k) \cdot g_i^{(S)}(k) \cdot g_i^{(U)}(k)} \quad (4)$$

Because shadowing is of zero mean log-normal distribution, we have:

$$\sum_{k=1}^{K} \alpha_i(k) \approx 1.$$

Further, since all users experience the same interference, by averaging over UTs, the perceived mean interference $E(I_{total})$ (estimate or expectation of $I_{total}$) for all the terminals (UTs) serviced by the particular GW in the respective GW beam can be expressed as follows:

$$E(I_{total}) = \sum_{i=1}^{M} I_i / M \quad (5)$$

$$= \frac{1}{M} \cdot \left[ \sum_{i=1}^{M} \frac{\sum_{k=1}^{K} \alpha_i(k)}{\sum_{k=1}^{K} \frac{SIR_i^{(p)}(k)}{P_i^{Tx,p}(k) \cdot d_i(k) \cdot g_i^{(S)}(k) \cdot g_i^{(U)}(k)}} \right]$$

$$\approx \frac{K}{M} \cdot \left[ \sum_{i=1}^{M} \frac{1}{\sum_{k=1}^{K} \frac{SIR_i^{(p)}(k)}{P_i^{Tx,p}(k) \cdot d_i(k) \cdot g_i^{(S)}(k) \cdot g_i^{(U)}(k)}} \right]$$

While SIR estimation at the gateway is per frame based, the PowerHR update interval may be of multiple frames. The updating interval of interference estimation, therefore may be based on the frequency of UT PowerHR reports, and SIR may take the mean value of this interval. For example, when the PowerHR reporting interval is no less than 5 radio frames (e.g., one radio frame=20 ms), the default value is K=1. According to example embodiments, it is desirable to have a larger M (e.g., M≥5), and thus a moving average is used to obtain the filtered $E(I_{total})$.

By way of example, filtering may be described as follows. Let $\bar{I}_t$ denote the averaged interference estimation at time interval t. Then the exponential moving average $\bar{I}_{t+1}$ at period t+1 can be calculated as:

$$\bar{I}_{t+1} = \beta I_{t+1} + (1-\beta)\bar{I}_t \quad (6)$$

where β is the timing factor. When t=1, the moving average is the initial measurement or estimate. The default value for the timing factor is β=0.2. Further, the filter response is set in order to respond to time varying load of the system—if the filter response is too slow, then the interference determination will not keep up with or accommodate for load variance over time. Accordingly, the filtering smooths the response over time in view of the sampling rate or update interval rate based on K.

One advantage achieved is that the approach according to example embodiments drops the assumption of known total number of UTs in a beam in deriving the beam level interference, and thus is independent of the topology of the coverage of a GW. A further advantage lies in that the derived beam level interference includes that from all sources in the same frequency (e.g., from the satellite and terrestrial terminals). The approach, according to example embodiments, therefore, is suitable for use in either single or multi-gateway interference management, as well as a hybrid satellite-terrestrial network sharing the same frequency.

Interference Management.

Residual Capacity. At the return link, the received power from multiple UTs in the satellite visible coverage area could create mutual interference. When the aggregate interference exceeds a certain level, the system becomes overloaded, power control has difficulty achieving convergence, and no additional service can be provided unless the QoS for some existing service is degraded. In accordance with example embodiments, therefore, a proactive admission control approach is provided to prevent such overload. A reactive congestion control mitigates interference by reducing system load when overloading occurs. According to such embodiments, a factor referred to as residual capacity $C_{RC}$ is used as a basis for making admission determinations in view of the determined interference.

The return link Nominal Capacity can be defined as the capacity measured in Voice Equivalent Resource (VER), which is the maximum amount of voice users that the system can support in one beam coverage under certain conditions. The nominal capacity can then be used by a GW for setting the upper limit for admission control. While such an approach may work for a one GW situation, the approach would be significantly less reliable (and perhaps not work at all) for an inter-gateway admission control scenario, where multiple GWs share the same nominal capacity without knowing the admitted number of UTs at each GW. Further, this approach also requires certain assumptions to be true, such as perfect power control, same channel condition and SIR, etc. In reality, however, contrary to the required assumptions, there are various types of traffic with different SIR requirements, channel condition may change, and power control may not be perfect.

In accordance with example embodiments, therefore, a novel approach for a residual capacity model for UT admission criteria, based on the estimated interference, is provided. By way of example, let the return interference from a GW beam (denoted as the reference beam) be $I_{intra}$ (namely, intra-beam interference), and the interference from neighboring beams be $I_{inter}$ (namely, inter-beam interference). By way of example, the total interference perceived at the GW of the reference beam $I_{total}$ is thus the summation of intra-beam and inter-beam interference plus the noise power $P_N$ (e.g., based on system noise), which can be expressed as:

$$\frac{I_{intra} + I_{inter}}{I_{total}} = 1 - \frac{P_N}{I_{total}} \quad (7a)$$

Further, the ratio $$\frac{P_N}{I_{total}},$$

which is the noise portion of the total interference, can be designated as $C_{RC}$ (the residual capacity).

$$C_{RC} = \frac{P_N}{I_{total}} \quad (7b)$$

When $I_{total}$ is small, this ratio is larger, meaning more users can be supported—on the other hand, when $I_{total}$ becomes large (meaning the system tends to be more loaded or even overloaded), the ratio gets small. Therefore, according to such embodiments, the residual capacity can be interpreted as the potential to accommodate additional users a beam can support.

By way of further example, denoting $\gamma_i = \text{SIR}_i^{(P)} = P_i/I_{total}$, where $P_i$ is the transmit power of the return signal (e.g., the power of the overall return signal) for each user terminal UT(i), i=1, 2, . . . , M, the following may be used to approximate the residual capacity (see, e.g., Vanghi, Damnjanovic, and Vojcic, "The CDMA2000 System for Mobile Communications," Prentice Hall, Upper Saddle River, N.J., 2004):

$$C_{RC} = \frac{P_N}{I_{total}} \approx \frac{1 - \sum_{i=1}^{J} \gamma_i/(1+\gamma_i)}{1 + I_{inter}/P_N} \quad (8)$$

Further, the inter-beam interference $I_{inter}$ is largely proportional to the loading at the surrounding beam edge, which is in a state of soft handoff. Therefore, increasing the load in the reference beam also increases the interference of adjacent beams, which in turn is reflected as increased inter-beam interference in the reference beam. Thus the residual capacity can further be expressed as:

$$C_{RC} \approx 1 - (1+\varphi)\sum_{i=1}^{K} \frac{\gamma_i}{1+\gamma_i} \quad (9)$$

where $\varphi$ represents the effective load increase due to other beam interference. The variable $\varphi$ can be a preconfigured estimated value or be estimated at run-time. By way of example, based on simulation results, an estimated value for $\varphi$ falls within a range of $0.4 \leq \varphi \leq 0.8$. Accordingly, for example embodiments, a value of $\varphi = 0.5$ would be an appropriate preconfigured value for a typical satellite system. The above equation also infers that an $i^{th}$ user terminal consumes an interference level of $$(1+\varphi)\frac{\gamma_i}{1+\gamma_i}$$

from the residual capacity.

In case of inter-gateway admission, for example, with a beam covered by two GWs, the residual capacity can be expressed as (where $L_1$ and $L_2$ are the number of UTs associated with each gateway, respectively):

$$C_{RC} = 1 - (1+\varphi)\left(\sum_{i=1}^{L_1} \frac{\gamma_i}{1+\gamma_i} + \sum_{j=1}^{L_2} \frac{\gamma_j}{1+\gamma_j}\right). \quad (10)$$

In accordance with example embodiments, therefore, using the foregoing described method interference estimation, the residual capacity can be obtained by $C_{RC} = P_N/E(I_{total})$, where $E(I_{total})$ is obtained based on Eq. (5), above. As an example, a nominal noise floor density of −202.11 dBW/Hz can be applied for the noise power by multiplying the bandwidth of 1.2288 MHz, resulting in nominal return link noise power of $P_N = -141.22$ dBW. The range of $C_{RC}$ should be constrained as $0 < C_{RC} \leq 1$.

Admission Control. According to example embodiments, one purpose of the admission control algorithm is to allow each GW to autonomously take admission as long as the beam interference level allows it to do so. On the other hand, if a GW observes that the beam interference level is too high to deteriorate the existing services due to admission from other beams, this GW should start to unload the traffic by reducing or temporarily stopping some packet data transmissions. With reference to FIG. 2, the upper layer processor may perform available VER calculations (as described below), and based on those calculations, the upper layer processor in combination with the capacity and admission management subsystem can perform the ultimate UT admission management and control of existing UT transmissions, in accordance with example embodiments of the present invention, to control overall interference and prevent system instability and overloading. The respective control signaling to the UTs to administer the admission control are passed on to the transmitter, which transmits the signaling to the respective UTs. By way of example, for admission control, a minimum threshold residual capacity $C_{RC,min}$ is set to prevent the system from operating too close to the nominal capacity, which may lead to instability. By way of further example, $C_{RC,min}$ may be within a range of $-10 \leq C_{RC,min} \leq -4$ dB, and $C_{RC,min}$ may take on a typical value of $C_{RC,min} = -7$ dB (which is equivalent to 20% of noise-to-total interference ratio).

A voice equivalent resource (VER) is the equivalent radio resource used for one voice traffic channel, which is one dedicated voice channel. Using VER provides convenience for radio resource management—effectively as a common currency of unit of measure for determining available capacity to admit a further UT, based on the number of VERs the added UT will consume from the residual capacity (based on the application or type of data transmission the UT is attempting to add to the beam/system). A packet data channel may have the rate of one or multiple VERs—e.g., 19.2 kbps packet data may be viewed as being equivalent to two voice calls (requiring 2 VERs of residual capacity), and 70 kbps packet data may be viewed as being equivalent to six voice calls (requiring 6 VERs of residual capacity). As derived above (see Eq. 9), each user terminal consumes $$(1+\varphi)\frac{\hat{\gamma}}{1+\hat{\gamma}}$$

from the residual capacity (per VER), and thus each newly admitted UT will consume that much interference capacity out of the residual capacity. Accordingly, taking $C_{RC,min}$, the available residual capacity of $C_{RC} - C_{RC,min}$ should be able to accommodate the number of components of $$(1+\varphi)\frac{\hat{\gamma}}{1+\hat{\gamma}}$$

required by a new UT seeking admission. The number of available VERs (denoted as $N_{Avail}^{VER}$), which is the equivalent number of UT voice channels that the beam can further admit, can thus be expressed as:

$$N_{Avail}^{VER} = \frac{C_{RC} - C_{RC,min}}{(1+\varphi)\frac{\hat{\gamma}}{1+\hat{\gamma}}} \quad (11)$$

where $\hat{\gamma}$ is the average or target SIR to maintain one VER link, and $\varphi$ is the effective load increase (admitting UT in one beam affecting the interference of other beams). By way of example, the value of $\varphi$ may range from approximately 0.4-0.8, subject to UT location and beam coverage. By way of further example, a nominal value of $\varphi=0.5$ may be applied as a default. $N_{Avail}^{VER}$ may be rounded to an integer value, and when it is larger than 0, admission or rate increase can be assumed under the constraint of available VERs. $N_{Avail}^{VER}$ becomes larger as $C_{RC}$ increases or $\varphi$ decreases.

A problem may arise (e.g., where GW-1 considers admitting a higher priority real-time source, and GW-2 has an existing service of a lower priority data source). If the interference level is high, GW-1 could reject the request since it does not know or control the existing data service in GW-2. If one gateway oversees both services, it can admit the real-time source by releasing or reducing the rate of existing data source. In accordance with example embodiments, to address this problem (e.g., in the multi-GW scenario), multiple thresholds of the residual capacity may be set for services with different priorities. For example, a lower threshold of residual capacity requirement may be set for high priority services and a higher threshold for lower priority services. If a real-time source is admitted by GW-1, it increases total interference level causing the system residual capacity lower. In observing that the instantaneous residual capacity is lower than the threshold for data traffic, GW-2 which has existing data service will start to take measures to release or reduce the rate of data service, and thus restore the system residual capacity to the normal level. In other words, in order to make room to admit a UT with a higher priority service, the GW can reduce the load of existing lower priority services, for example, by reducing the data rate of such services, which in turn would reduce the power transmission of the UTs whose data rate was lowered and consequently reduce the respective interference contributions to make room for the new higher priority UT.

By way of example, the process may be described as follows. Let $C_{RC,min}^{D}$ and $C_{RC,min}^{V}$ denote the minimum threshold for non-real-time (e.g., data) and real-time (e.g., video) traffic flows, respectively. Nominal values may be set as follows: $C_{RC,min}^{D}=0.25$ (or −6 dB) and $C_{RC,min}^{V}=0.15$ (or −8 dB). The available VERs for data $N_{Avail}^{VER,D}$ and real-time video $N_{Avail}^{VER,V}$ may respectively be calculated as:

$$N_{Avail}^{VER,D} = \frac{C_{RC} - C_{RC,min}^{D}}{(1+\varphi)\frac{\hat{\gamma}}{1+\hat{\gamma}}} \quad (12)$$

$$N_{Avail}^{VER,V} = \frac{C_{RC} - C_{RC,min}^{V}}{(1+\varphi)\frac{\hat{\gamma}}{1+\hat{\gamma}}} \quad (13)$$

The admission and rate change criteria for inter-gateway resource management may be as follows:
1) If $N_{Avail}^{VER,V}>0$, a new voice UT can be admitted—otherwise, it should be rejected;
2) If $N_{Avail}^{VER,V}>h$, where h is the minimum required VERs for a video source, a video request can be admitted—otherwise it should be rejected;
3) If $N_{Avail}^{VER,D}>0$, new data requests can be activated or rate increased subject to the value of $N_{Avail}^{VER,D}$—otherwise data rate shall be reduced or data transmission temporally stopped.

According to example embodiments, the following provides example guidelines for the admission criteria. Suppose two beams operated by two gateways cover the same area. The return link interference would be transparent to both beams and thus $N_{Avail}^{VER}$ is shared by two gateways. Since $N_{Avail}^{VER}$ is derived indirectly (in the sense not by counting existing UTs associated with one gateway), the observed time varying $N_{Avail}^{VER}$ by each gateway reflects the current interference level taking into account the existing UTs in another beam. Therefore, the aforementioned admission criteria for multiple gateways would be the same as that for one gateway, and each can operate autonomously, and in a proactive fashion. Moreover, the approach of example embodiments is also reactive in the sense that, when a beam is overloaded, it should reduce the interference level by reducing traffic load until the residual capacity is restored above the minimum threshold—for example, by reducing the rate of an existing packet data channel, or handing out a UT to another frequency band, or releasing an entire traffic channel.

Figure 3:
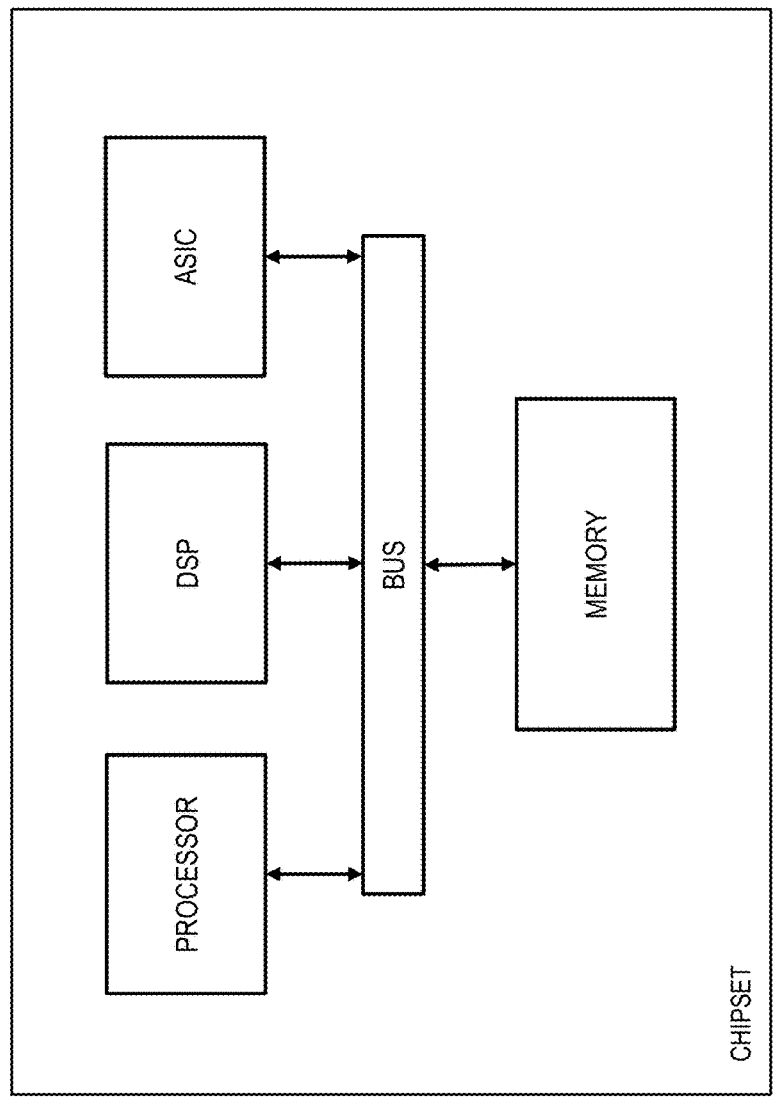
FIG. 3 illustrates a block diagram of a chip set that can be utilized in implementing example embodiments according to the present invention.

FIG. 3 illustrates a block diagram of a chip set that can be utilized in implementing example embodiments according to the present invention. The chip set includes, for instance, processor and memory components described with respect to FIG. 3 incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set includes a communication mechanism such as a bus for passing information among the components of the chip set. A processor has connectivity to the bus to execute instructions/programs and process information stored in, for example, a memory. The processor may include one or more processing cores with each core configured to perform independently. A multi-core processor enables multiprocessing within a single physical package, such as two, four, eight, or greater numbers of processing cores. Alternatively or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP), and/or one or more application-specific integrated circuits (ASIC). A DSP typically is configured to process real-time signals (e.g., sound or video) in real time independently of the processor. Similarly, an ASIC can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor and accompanying components have connectivity to the memory via the bus. The memory may include both dynamic memory (e.g., RAM) and static memory (e.g., ROM) for storing executable instructions that, when executed by the processor and/or the DSP and/or the ASIC, perform the process of example embodiments as described herein. The memory may also store the data associated with or generated by the execution of the process.

Further, the functionality of the example embodiments of the present invention may be provided by the chip set, in response to the processor executing an arrangement of program instructions contained in memory. Execution of the program instructions contained in memory causes the processor to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

Figure 4:
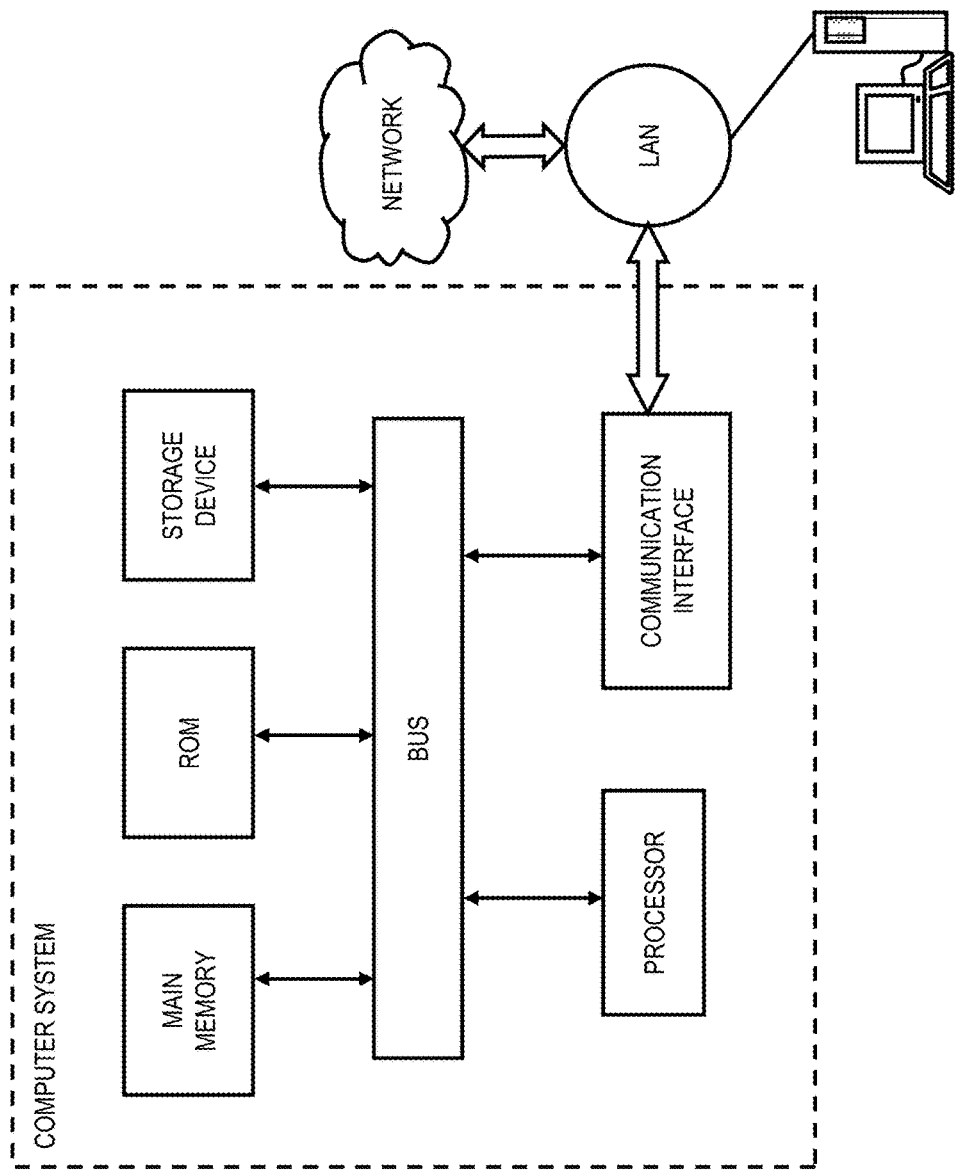
FIG. 4 illustrates a computer system that can be utilized in the implementation of example embodiments according to the present invention.

FIG. 4 illustrates a computer system that can be utilized in the implementation of example embodiments according to the present invention. The computer system includes a bus or other communication mechanism for communicating information, and a processor coupled to the bus for processing information. The computer system also includes main memory, such as a random access memory (RAM) or other dynamic storage device, coupled to the bus for storing information and instructions to be executed by the processor. Main memory can also be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is additionally coupled to the bus for storing information and instructions.

According to one embodiment of the invention, dynamic and flexible approaches for selective dynamic disabling of transport layer handshake spoofing, are provided by the computer system in response to the processor executing an arrangement of instructions contained in main memory. Such instructions can be read into main memory from another computer-readable medium, such as the storage device. Execution of the arrangement of instructions contained in main memory causes the processor to perform the process steps described herein. One or more processors in a multi-processing arrangement may also be employed to execute the instructions contained in main memory. In alternative embodiments, hard-wired circuitry is used in place of or in combination with software instructions to implement the embodiment of the present invention. Thus, embodiments of the present invention are not limited to any specific combination of hardware circuitry and software.

The computer system also includes a communication interface coupled to bus. The communication interface provides a two-way data communication coupling to a network link connected to a local network. For example, the communication interface may be a digital subscriber line (DSL) card or modem, an integrated services digital network (ISDN) card, a cable modem, or a telephone modem to provide a data communication connection to a corresponding type of telephone line. As another example, communication interface may be a local area network (LAN) card (e.g. for Ethernet™ or an Asynchronous Transfer Mode (ATM) network) to provide a data communication connection to a compatible LAN. Wireless links can also be implemented. Further, the communication interface, for example, includes peripheral interface devices, such as a Universal Serial Bus (USB) interface, a PCMCIA (Personal Computer Memory Card International Association) interface, etc.

The network link typically provides data communication through one or more networks to other data devices. For example, the network link provides a connection through local network to a host computer, which has connectivity to a network (e.g. a wide area network (WAN) or the global packet data communication network now commonly referred to as the "Internet") or to data equipment operated by service provider. The computer system sends messages and receives data, including program code, through the network(s), network link, and communication interface. In the Internet example, a server (not shown) might transmit requested code belonging to an application program for implementing an embodiment of the present invention through the network, local network and communication interface. The processor executes the transmitted code while being received and/or store the code in storage device, or other non-volatile storage for later execution.

The term "computer-readable medium" as used herein refers to any medium that participates in providing instructions to the processor for execution. Such a medium may take many forms, including but not limited to non-volatile media, volatile media, and transmission media. Non-volatile media include, for example, optical or magnetic disks, such as storage device. Volatile media may include dynamic memory, such as main memory. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Further, as will be appreciated, a module or component (as referred to herein) may be composed of software component(s), which are stored in a memory or other computer readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention. The specification and drawings are accordingly to be regarded in an illustrative rather than restrictive sense.

What is claimed is:

1. A method comprising:
   receiving, by a receiver of a gateway (GW) terminal, a plurality of return link signals, each return link signal being received via a satellite from a respective user terminal (UT) located within a satellite beam serviced by the GW terminal;
   determining a transmit power factor for each UT based on the respective return link signal;
   determining an interference factor for each UT based on the respective return link signal;
   determining a total interference factor for the UTs from which the plurality of return link signals have been received based on the transmit power factors and the interference factors determined for the UTs;
   determining a residual capacity level for the satellite beam based on the determined total interference factor and a noise power factor;
   receiving an admission request from a further UT requesting admission for transmission of a respective return link signal by the further UT;
   determining an available residual capacity level as the residual capacity level minus a minimum residual capacity level buffer value; and
   granting the admission request based on a comparison of a required capacity level for the respective return link signal of the further UT relative to the determined available residual capacity level; and
   wherein the available residual capacity level is determined in terms of a number of available resource units, wherein one resource unit reflects a capacity level associated with a base signal type with respect to the return link signals of the UTs located within the satellite beam serviced by the GW terminal, and the required capacity level for the respective return link signal of the further UT reflects a number of the available resource units required for transmission of the return link signal of the further UT to the GW terminal via the satellite beam, and
   wherein one resource unit reflects a capacity level required for one voice traffic link as the return link signal of the further UT, designated as VER, wherein:

$$VER = (1+\varphi)\frac{\hat{\gamma}}{1+\hat{\gamma}},$$

where $\varphi$ represents an effective load increase for one VER link due to other beam interference and $\hat{\gamma}$ represents an average or target signal to interference ratio for maintaining one VER link; and
the available residual capacity in terms of the number of available resource units, designated as $N_{Avail}^{VER}$, is expressed as $$N_{Avail}^{VER} = \frac{C_{RC} - C_{RC,min}}{(1+\varphi)\frac{\hat{\gamma}}{1+\hat{\gamma}}},$$

where $C_{RC}$ is the residual capacity, $C_{RC,min}$ is the minimum residual capacity level buffer.

2. The method according to claim 1, wherein the respective return link signal of the further UT is characterized as one of two or more signal types with respect to the return link signals of the UTs located within the satellite beam serviced by the GW terminal, the method further comprising:
   determining an available residual capacity level for each of the two or more signal types, wherein each available residual capacity level is determined as the residual capacity level minus a minimum residual capacity level buffer for the respective signal type;
   wherein the determination of whether to grant the admission request is based on the required capacity level for the signal type of the respective return link signal of the further UT relative to the determined available residual capacity level for the respective signal type.

3. The method according to claim 2, wherein the available residual capacity level for each signal type is determined in terms of a number of available resource units for the respective signal type, wherein one resource unit reflects a capacity level associated with a base signal type with respect to the return link signals, and the required capacity level for the respective return link signal type of the further UT reflects a number of the available resource units for the respective signal type required for transmission of the return link signal of the further UT to the GW terminal via the satellite beam.

4. A method comprising:
   receiving, by a receiver of a gateway (GW) terminal, a plurality of return link signals, each return link signal being received via a satellite from a respective user terminal (UT) located within a satellite beam serviced by the GW terminal;
   determining a transmit power factor for each UT based on a power-headroom value for the UT conveyed by the respective return link signal and a maximum transmit power of the UT;

determining an interference factor for each UT, wherein the interference factor for each UT reflects a signal to interference ratio estimated by the GW terminal receiver based on the respective return link signal;

determining a total interference factor for the UTs from which the plurality of return link signals have been received based on the transmit power factors and the interference factors determined for the UTs;

determining a residual capacity level for the satellite beam based on the determined total interference factor and a noise power factor;

receiving an admission request from a further UT requesting admission for transmission of a respective return link signal by the further UT; and granting the admission request based on a comparison of a required capacity level for the respective return link signal of the further UT relative to the determined residual capacity level; and wherein determining the total interference factor for the UTs is determined by applying an averaging function based on a plurality of parameters for each UT, including the determined transmit power factor and the determined interference factor; and wherein the plurality of parameters upon which the averaging function is based further includes one or more of a return link path loss, an antenna gain with respect to the satellite, an antenna gain with respect to the UT, and a shadowing factor, and wherein the averaging function for determining the total interference factor, denoted as $E(I_{total})$ as is $$E(I_{total}) = \frac{1}{M} \cdot \left[ \sum_{i=1}^{M} \frac{1}{\sum_{k=1}^{K} \frac{SIR_i^{(p)}(k)}{P_i^{Tx,p}(k) \cdot d_i(k) \cdot g_i^{(S)}(k) \cdot g_i^{(U)}(k)}} \right],$$

where M is the number of UTs within the satellite beam serviced by the GW terminal, and, for each user terminal UT(i), $d_i$ is the return link path loss, $g_i^{(S)}$ is the antenna gain with respect to the satellite, and $g_i^{(U)}$ is the antenna gain with respect to the UT.

5. A gateway (GW) terminal apparatus comprising:

a receiver configured to receive a plurality of return link signals and to determine an interference factor for each UT based on the respective return link signal, each return link signal being received via a satellite from a respective user terminal (UT) located within a satellite beam serviced by the GW terminal apparatus; and a processor configured to determine a transmit power factor of the return link signal for each UT based on the respective return link signal, to determine a total interference factor for the UTs from which the plurality of return link signals have been received based on the transmit power factors and the interference factors determined for the UTs, and to determine a residual capacity level for the satellite beam based on the determined total interference factor and a noise power factor; and wherein the receiver is further configured to receive an admission request from a further UT requesting admission for transmission of a respective return link signal by the further UT, wherein the processor is further configured to determine an available residual capacity level as the residual capacity level minus a minimum residual capacity level buffer value, wherein the processor is further configured to grant the admission request based on a comparison of a required capacity level for the respective return link signal of the further UT relative to the determined available residual capacity level, wherein the available residual capacity level is determined in terms of a number of available resource units, wherein one resource unit reflects a capacity level associated with a base signal type with respect to the return link signals of the UTs located within the satellite beam serviced by the GW terminal, and the required capacity level for the respective return link signal of the further UT reflects a number of the available resource units required for transmission of the return link signal of the further UT to the GW terminal via the satellite beam, and wherein one resource unit reflects a capacity level required for one voice traffic link as the return link signal of the further UT, designated as VER, wherein:

$$VER = (1 + \varphi) \frac{\hat{\gamma}}{1 + \hat{\gamma}},$$

where $\varphi$ represents an effective load increase for one VER link due to other beam interference and $\hat{\gamma}$ represents an average or target signal to interference ratio for maintaining one VER link; and the available residual capacity in terms of the number of available resource units, designated as $N_{Avail}^{VER}$, is expressed as $$N_{Avail}^{VER} = \frac{C_{RC} - C_{RC,min}}{(1+\varphi)\frac{\hat{\gamma}}{1+\hat{\gamma}}},$$

where $C_{RC}$ is the residual capacity, $C_{RC,min}$ is the minimum residual capacity level buffer.

6. The GW terminal apparatus according to claim 5, wherein the respective return link signal of the further UT is characterized as one of two or more signal types with respect to the return link signals of the UTs located within the satellite beam serviced by the GW terminal apparatus, wherein:

the processor is configured to determine an available residual capacity level for each of the two or more signal types, wherein each available residual capacity level is determined as the residual capacity level minus a minimum residual capacity level buffer for the respective signal type; and wherein the determination of whether to grant the admission request is based on the required capacity level for the signal type of the respective return link signal of the further UT relative to the determined available residual capacity level for the respective signal type.

7. The GW terminal apparatus according to claim 6, wherein the available residual capacity level for each signal type is determined in terms of a number of available resource units for the respective signal type, wherein one resource unit reflects a capacity level associated with a base signal type with respect to the return link signals, and the required capacity level for the respective return link signal type of the further UT reflects a number of the available resource units for the respective signal type required for transmission of the return link signal of the further UT to the GW terminal apparatus via the satellite beam.

8. A gateway (GW) terminal apparatus comprising:
a receiver configured to receive a plurality of return link signals and to determine an interference factor for each UT, wherein the interference factor for each UT reflects a signal to interference ratio estimated by the GW receiver based on the respective return link signal, and wherein each return link signal being is received via a satellite from a respective user terminal (UT) located within a satellite beam serviced by the GW terminal apparatus; and
a processor configured to determine a transmit power factor for each UT based on a power-headroom value for the UT conveyed by the respective return link signal and a maximum transmit power of the UT, to determine a total interference factor for the UTs from which the plurality of return link signals have been received based on the transmit power factors and the interference factors determined for the UTs, and to determine a residual capacity level for the satellite beam based on the determined total interference factor and a noise power factor; and
wherein the receiver is further configured to receive an admission request from a further UT requesting admission for transmission of a respective return link signal by the further UT,
wherein the processor is further configured to determine whether to grant the admission request based on a comparison of a required capacity level for the respective return link signal of the further UT relative to the determined residual capacity level,
wherein the total interference factor for the UTs is determined by applying an averaging function based on a plurality of parameters for each UT, including the determined transmit power factor and the determined interference factor,
wherein the plurality of parameters upon which the averaging function is based further includes one or more of a return link path loss, an antenna gain with respect to the satellite, an antenna gain with respect to the UT, and a shadowing factor, and
wherein the averaging function for determining the total interference factor, denoted as E ($I_{total}$), is as $$E(I_{total}) = \frac{1}{M} \cdot \left[ \sum_{i=1}^{M} \frac{1}{\sum_{k=1}^{K} \frac{SIR_i^{(p)}(k)}{P_i^{Tx,p}(k) \cdot d_i(k) \cdot g_i^{(s)}(k) \cdot g_i^{(U)}(k)}} \right],$$

where M is the number of UTs within the satellite beam serviced by the GW terminal, and, for each user terminal UT (i), $d_i$ is the return link path loss, $g_i^{(S)}$ is the antenna gain with respect to the satellite, and $g_i^{(U)}$ is the antenna gain with respect to the UT.

9. The method according to claim 1, further comprising:
obtaining a power-headroom value for each UT conveyed by the respective return link signal, wherein the transmit power factor for the UT is determined based on the respective power-headroom value and a maximum transmit power of the UT.

10. The method according to claim 9, wherein the transmit power factor of the return link signal for each UT ($P_{Tx}$) is determined based on the respective power headroom value ($P_{TX}$) and a maximum transmit power ($P_{Tx-max}$) of the UT as $P_{Tx} = P_{Tx-max} - P_{HR}$.

11. The method according to claim 1, wherein the interference factor for each UT reflects a signal to interference ratio estimated by the GW terminal receiver based on the respective return link signal.

12. The GW terminal apparatus according to claim 5, wherein the processor is further configured to obtain a power-headroom value for each UT conveyed by the respective return link signal, wherein the transmit power factor for the UT is determined based on the respective power-headroom value and a maximum transmit power of the UT.

13. The method according to claim 12, wherein the transmit power factor of the return link signal for each UT ($P_{Tx}$) is determined based on the respective power headroom value ($P_{TX}$) and a maximum transmit power ($P_{Tx-max}$) of the UT as $P_{Tx} = P_{Tx-max} - P_{HR}$.

14. The GW terminal apparatus according to claim 5, wherein the interference factor for each UT reflects a signal to interference ratio estimated by the receiver based on the respective return link signal.

* * * * *